US007433420B1

United States Patent
Dakshinamurthy et al.

(10) Patent No.: US 7,433,420 B1
(45) Date of Patent: Oct. 7, 2008

(54) PHASE ROTATION ESTIMATION

(75) Inventors: Sriraman Dakshinamurthy, San Jose, CA (US); Joel L. Dawson, Cambridge, MA (US); Derek K. Shaeffer, Redwood City, CA (US); Korhan Titizer, Saratoga, CA (US)

(73) Assignee: Beceem Communications Inc., Santa Clara, CA (US)

( * ) Notice: Subject to any disclaimer, the term of this patent is extended or adjusted under 35 U.S.C. 154(b) by 632 days.

(21) Appl. No.: 11/061,153

(22) Filed: Feb. 18, 2005

(51) Int. Cl.
*H04L 25/49* (2006.01)
(52) U.S. Cl. .................................... 375/296
(58) Field of Classification Search ............... 375/285, 375/295, 296, 297, 371, 376; 455/63.1, 114.2, 455/114.3
See application file for complete search history.

(56) References Cited

U.S. PATENT DOCUMENTS

| 5,774,510 | A | * | 6/1998 | Izzard | 375/375 |
| 6,094,464 | A | * | 7/2000 | Ebringer et al. | 375/342 |
| 6,535,562 | B1 | * | 3/2003 | Mohseni et al. | 375/296 |
| 7,020,447 | B2 | * | 3/2006 | Nagatani et al. | 455/114.3 |

OTHER PUBLICATIONS

Dawson et al., "Automatic Phase Alignment for a Fully Integrated Cartesian Feedback Power Amplifier System", IEEE Journal of Solid-State Circuits, Dec. 2003, 38(12): 2269-2279.
Faulkner et al., "Performance of automatic phase adjustment using supply current minimization in a RF feedback lineariser," in Proc. 8th IEEE Int. symp. Personal, Indoor, and Mobile Radio Communications, 1997, pp. 858-862.
Ohishi et al., "Cartesian Feedback Amplifier with Soft Landing," in Proc. 3rd IEEE Int. Symp. Personal, indoor, and Wireless Communications, 1992, pp. 402-406.
Sornin et al., "A robust Cartesian feedback loop for a 802.11 a/b/g CMOS transmitter", 2004 IEEE Radio Frequency Integrated Circuits (RFIC) Symposium, Forth Worth, TX, Jun. 6-8, 2004, pp. 145-148.

* cited by examiner

*Primary Examiner*—Khanh C Tran

(57) ABSTRACT

Apparatus, systems, and methods are described that implement techniques for estimating a relative rotation between a first complex signal and a second complex signal. In apparatus form, a rotation-estimation circuit includes a first quadrant detector and receives the first and second complex signals and produces an estimate of the relative rotation between the complex signals. A variable rotator receives the estimate of the relative rotation and rotates at least one of the first and second complex signals using the estimate of the relative rotation. In method form, a first quadrant estimate is calculated that corresponds to the relative rotation between the first and second complex signals, and at least one of the first and second complex signals is rotated using the quadrant estimate of the relative rotation.

17 Claims, 4 Drawing Sheets

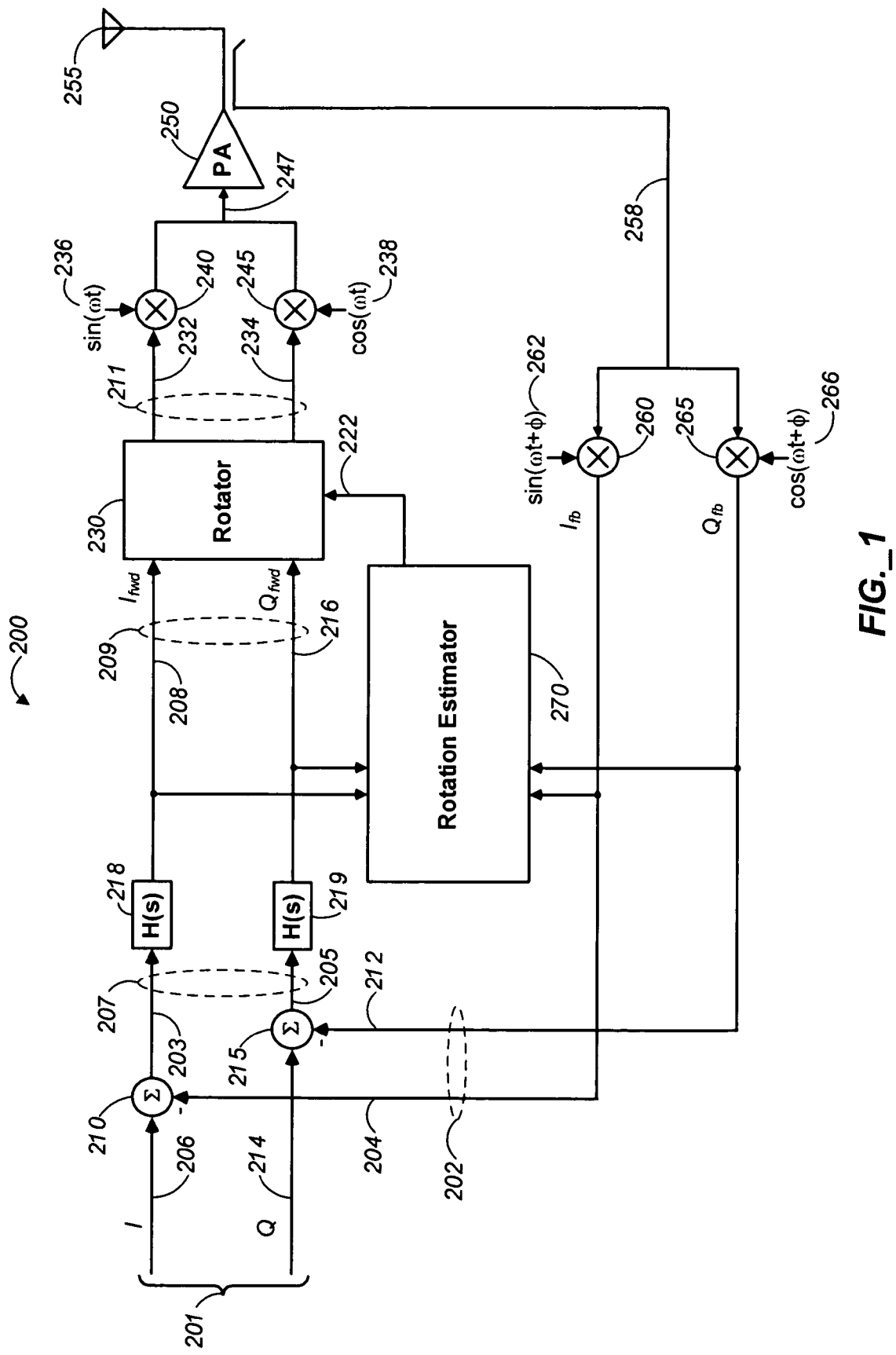
FIG._1

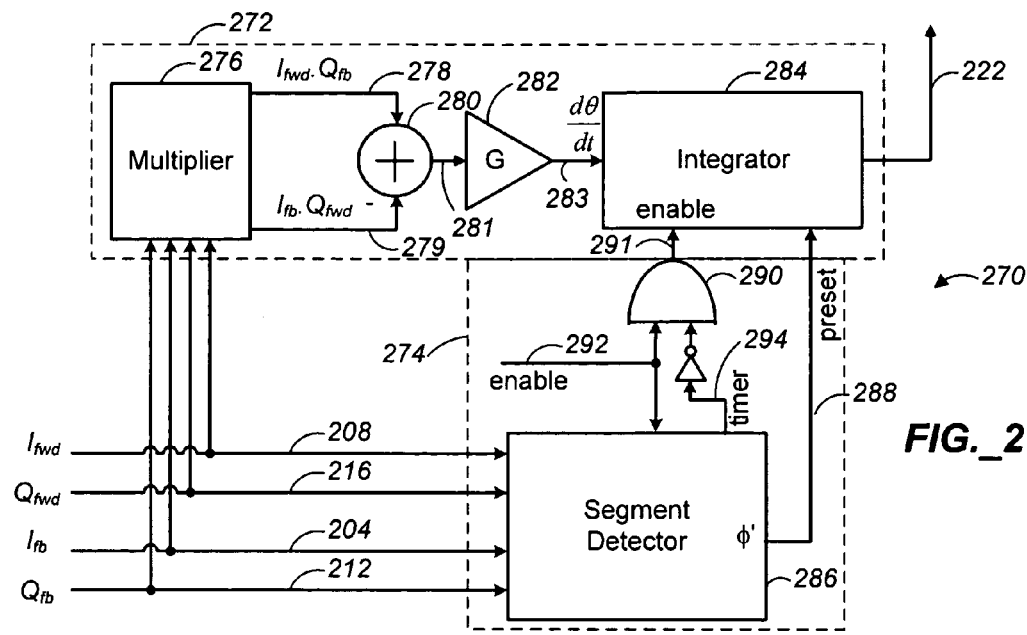
FIG._2
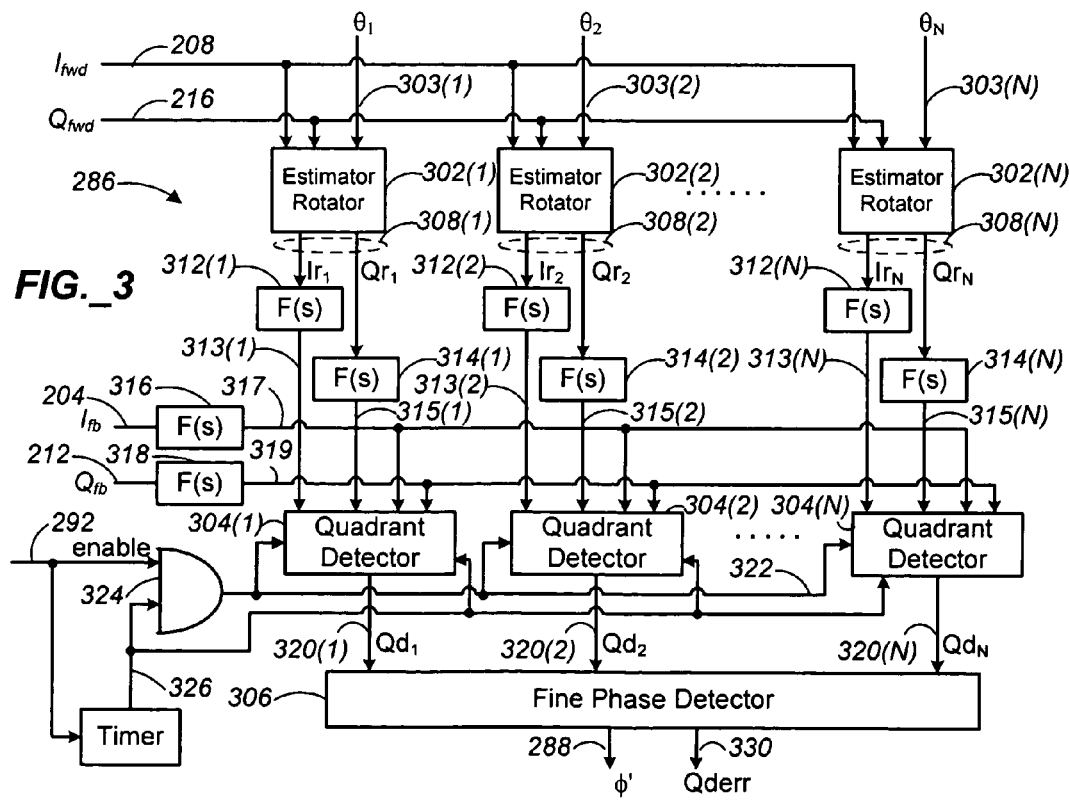
FIG._3

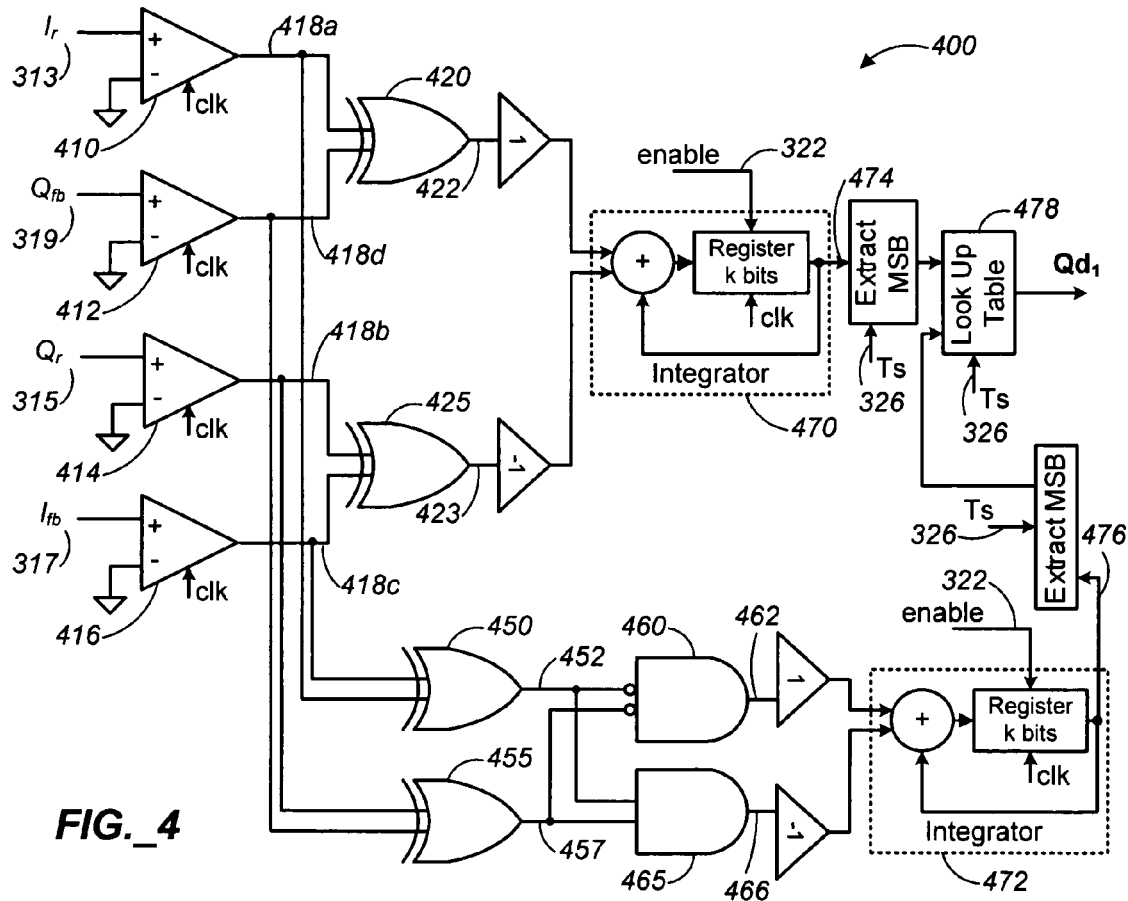
FIG._4
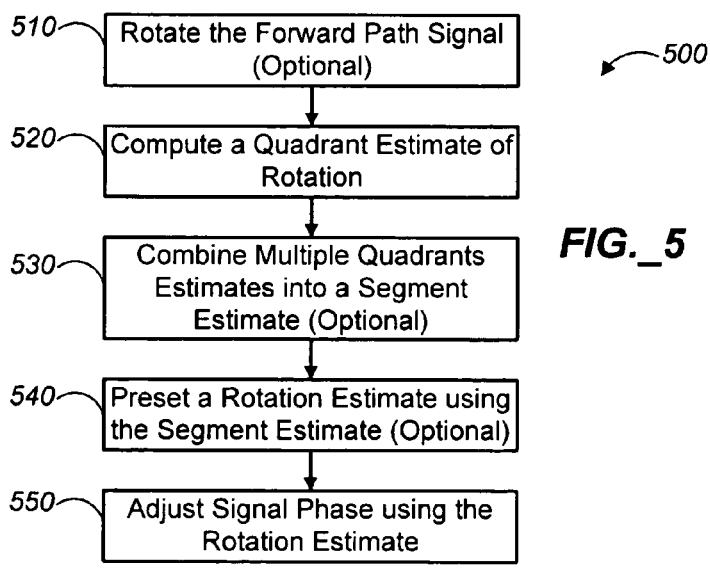
FIG._5

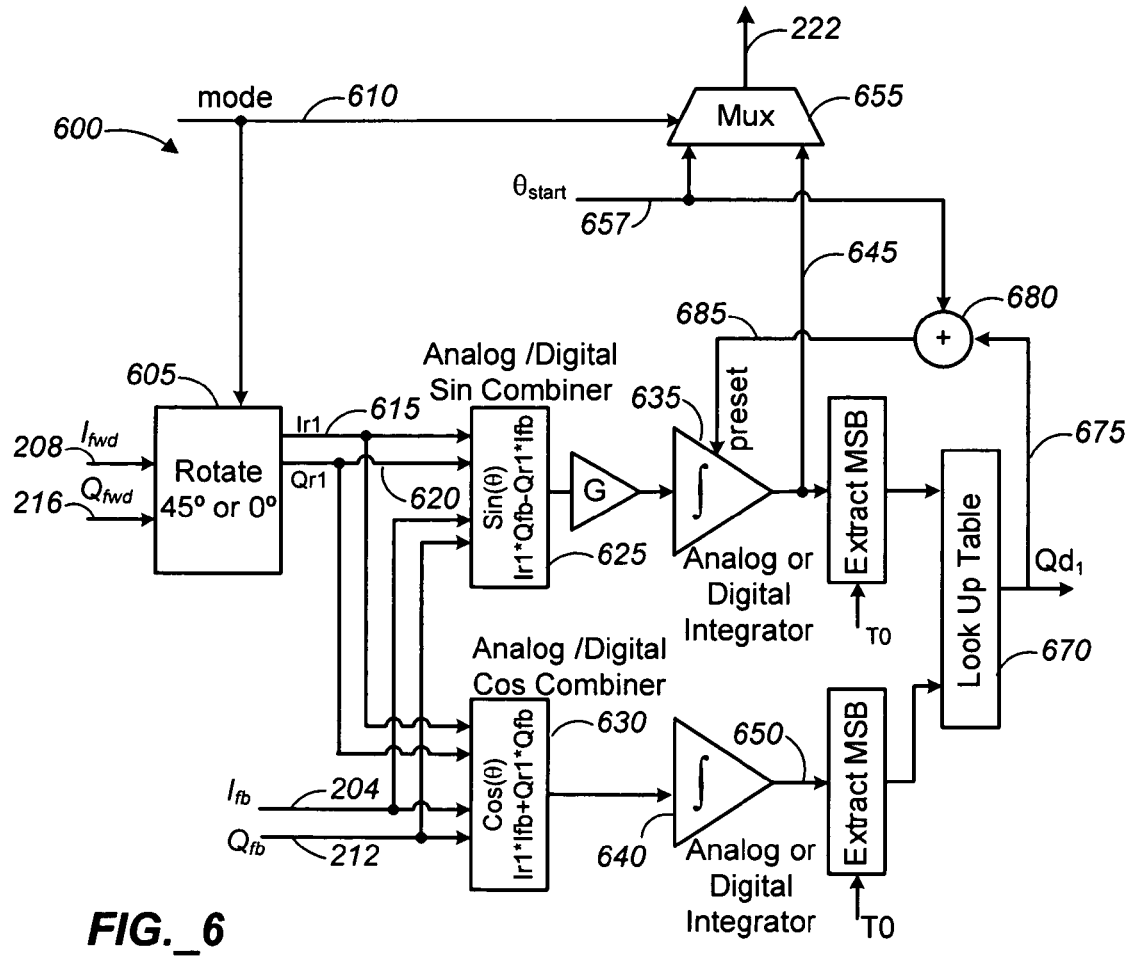
FIG._6
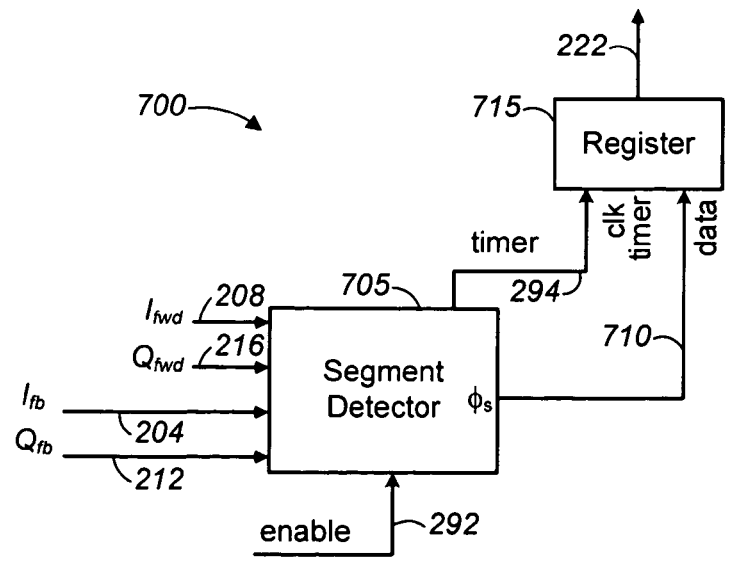
FIG._7

PHASE ROTATION ESTIMATION

BACKGROUND

The following disclosure relates to electrical circuits and signal processing.

Aligning the phases of two or more signals in a communication system can be useful. The signals can be information signals at multiple points in a signal path. For example, in a communications system that uses feedback, the phase of a feedback signal may need to be aligned with the phase of a forward path signal for the system to operate correctly or efficiently. Aligning two signals is equivalent to making the relative rotation between the signals substantially zero.

A relative rotation (for example, between two complex signals) can have several causes. In a conventional application, a first complex signal can be used to modulate a radio-frequency (RF) carrier. The modulated carrier, an RF signal, undergoes analog processing, after which the modulated carrier can be demodulated. A second complex signal results from the demodulation. Any difference in phase between the modulated carrier before the processing and the modulated carrier after the processing is manifested as a relative rotation between baseband constellations corresponding to the first and second complex signals.

An example of a component in a communications system that uses feedback is a Cartesian feedback transmitter. In a conventional Cartesian feedback transmitter, a complex feedback signal is subtracted from a complex input signal to produce a complex error signal. The complex error signal is amplified and filtered to produce an intermediate signal, which is then modulated for transmission. The modulated signal is also demodulated in the transmitter to produce the complex feedback signal. Using Cartesian feedback in a transmitter improves the linearity of the transmitter, but properly aligning the phases of the complex intermediate signal and the complex feedback signal is important for stable operation.

The complex feedback signal typically has a different phase than the complex intermediate signal because of, for example, delays in the RF signal path or a phase difference between the oscillator signal used during modulation and the oscillator signal used during demodulation. A change in output power level or a change in carrier frequency can also cause a relative rotation between the complex intermediate signal and the complex feedback signal. The phase of the complex intermediate signal can be adjusted (e.g., by using a rotator circuit) to align the complex intermediate signal and the complex feedback signal. The adjustment of the phase of the complex intermediate signal can be controlled based on, for example, an estimate of the relative rotation between the complex intermediate signal and the complex feedback signal.

One technique that can be used to estimate the phase difference between the complex intermediate signal and the complex feedback signal is to multiply the in-phase component of the complex intermediate signal ($I_{fwd}$) by the quadrature component of the complex feedback signal ($Q_{fb}$) and to multiply the quadrature component of the complex intermediate signal ($Q_{fwd}$) by the in-phase component of the complex feedback signal ($I_{fb}$), all multiplication being done in the analog domain. The second product ($Q_{fwd} I_{fb}$) is then subtracted from the first product ($I_{fwd} Q_{fb}$), and the result is integrated. A rotator circuit can use the integrated result to rotate the phase of the complex intermediate signal with respect to the complex feedback signal.

SUMMARY

Apparatus, systems, and methods are described that implement techniques for estimating a relative rotation between a first complex signal and a secon complex signal.

In apparatus form, a rotation-estimation circuit includes a first quadrant detector and receives the first and second complex signals and produces an estimate of the relative rotation between the complex signals. A variable rotator receives the estimate of the relative rotation and rotates at least one of the first and second complex signals using the estimate of the relative rotation.

In method form, a first quadrant estimate is calculated that corresponds to the relative rotation between the first and second complex signals, and at least one of the first and second complex signals is rotated using the quadrant estimate of the relative rotation.

The techniques described herein can be implemented to realize one or more of the following advantages. A phase difference between two complex signals is estimated quickly and accurately. The output of the technique can be used as a preset for a conventional phase alignment loop. The technique simplifies hardware and/or arithmetic operations used for fast and accurate phase estimation.

These general and specific aspects may be implemented using an apparatus, a method, a system, or any combination of apparatus, methods, and systems.

The details of one or more implementations are set forth in the accompanying drawings and the description below. Other features and advantages will become apparent from the description, the drawings, and the claims.

BRIEF DESCRIPTION OF THE DRAWINGS

FIG. 1 is a block diagram of a feedback transmitter.
FIG. 2 is a block diagram of a rotation estimator.
FIG. 3 is a block diagram of a segment detector.
FIG. 4 is a schematic of a quadrant detector.
FIG. 5 is a flowchart of a process for estimating and adjusting a rotation between two complex signals.
FIG. 6 is a block diagram of a rotation estimator.
FIG. 7 is a block diagram of a rotation estimator.

Like reference numbers and designations in the various drawings indicate like elements.

DETAILED DESCRIPTION

FIG. 1 shows a feedback transmitter 200, hereafter referred to as transmitter 200. Transmitter 200 receives a complex input signal 201 from, for example, a baseband circuit and subtracts a complex feedback signal 202 from complex input signal 201. A summer 210 subtracts an in-phase component 204 of complex feedback signal 202 from an in-phase component 206 of complex input signal 201 to produce an in-phase component 203 of a complex error signal 207. A summer 215 subtracts a quadrature component 212 of complex feedback signal 202 from a quadrature component 214 of complex input signal 201 to produce a quadrature component 205 of complex error signal 207. Filter 218 filters in-phase component 203 of complex error signal 207 to produce an in-phase component 208 of a complex forward path signal 209 and filter 219 filters quadrature component 205 of complex error signal 207 to produce a quadrature component 216 of complex forward path signal 209. Filters 218 and 219 provide a gain to complex error signal 207. Any of complex input signal 201, complex feedback signal 202, complex error signal 207, and complex forward path signal 209 can be a continuous-time signal or a discrete-time signal.

A signal path rotator 230 receives in-phase component 208 and quadrature component 216 of complex forward path signal 209 and rotates complex forward path signal 209 responsive to a rotation signal 222, which is an estimate of the relative rotation between complex feedback signal 202 and complex forward path signal 209, to produce a complex rotated signal 211. Rotator 230 can rotate the phase of complex forward path signal 209 by computing an in-phase component 232 of complex rotated signal 211 and a quadrature component 234 of complex rotated signal 211 as weighted sums of in-phase component 208 and quadrature component 216 of complex forward path signal 209. In one implementation, rotator 230 rotates the phase of complex forward path signal 209 by shifting the phase of first local-oscillator signals 236 and 238 relative to the phase of second local-oscillator signals 262 and 266. In another implementation, rotator 230 rotates the phase of complex feedback signal 202 by shifting the phase of second local-oscillator signals 262 and 266 relative to the phase of first local-oscillator signals 236 and 238. In one implementation, rotator 230 is placed in the feedback path of transmitter 200 (e.g., between summers 210 and 215 and mixers 260 and 266), and rotator 230 rotates complex feedback signal 202 instead of complex forward path signal 209. Alternatively, in one implementation, rotator 230 can be placed anywhere in the baseband signal path to the right of or below summers 210 and 215.

A mixer 240 mixes in-phase component 232 of complex rotated signal 211 with a first in-phase local-oscillator signal 236 and a mixer 245 mixes quadrature component 234 of complex rotated signal 211 with a first quadrature local-oscillator signal 238 to produce a modulated signal 247. Modulated signal 247 is amplified by a power amplifier 250 and is transmitted by antenna 255. A mixer 260 receives a modulated signal 258 that corresponds to the signal transmitted by antenna 255. Mixer 260 mixes modulated signal 258 with a second in-phase local-oscillator signal 262 to produce in-phase component 204 of the complex feedback signal 202. A mixer 265 also receives modulated signal 258 and mixes modulated signal 258 with a second quadrature local-oscillator signal 266 to produce quadrature component 212 of complex feedback signal 202. Complex feedback signal 202 typically has a different phase than complex rotated signal 211 because of, for example, delays in the signal path (e.g., the signal path between the outputs of mixers 240 and 245 and the inputs of mixers 260 and 265) or a phase difference between the local-oscillator signals (i.e., first local-oscillation signals 236 and 238) provided to mixers 240 and 245 and the local-oscillator signals (i.e., second local-oscillator signals 262 and 266) provided to mixers 260 and 265. All sources of relative rotation between complex feedback signal 202 and complex rotates signal 211 can be modeled (e.g., by the phase φ in second local-oscillator signals 262 and and 266) as being caused by a phase difference between first local-oscillator signals 236 and 238 and second local-oscillator signal 262 and 266. Complex feedback signal 202 is provided to summers 210 and 215.

A rotation estimator 270 receives in-phase component 204 and quadrature component 212 of complex feedback signal 202 and in-phase component 208 and quadrature component 216 of complex forward path signal 209 and generates rotation signal 222, which is an estimate of the relative rotation between complex feedback signal 202 and complex forward path signal 209. Generating rotation signal 222 quickly and accurately is beneficial. A preset circuit can preset the value of rotation signal 222 to increase the speed and accuracy of rotation estimator 270.

As shown in FIG. 2, rotation estimator 270 includes a phase aligner 272 and a preset circuit 274. Phase aligner 272 includes a multiplier 276 that receives in-phase component 204 and quadrature component 212 of complex feedback signal 202 and in-phase component 208 and quadrature component 216 of complex forward path signal 209. Multiplier 276 generates combination signals 278 and 279 and provides combination signals 278 and 279 to a combiner 280. Combination signal 278 results from multiplying quadrature component 212 of complex feedback signal 202 and in-phase component 208 of complex forward path signal 209. Combination signal 279 results from multiplying in-phase component 204 of complex feedback signal 202 and quadrature component 216 of complex forward path signal 209. Combiner 280 subtracts combination signal 279 from combination signal 278 to produce a phase error signal 281 ($I_{fwd}Q_{fb} - Q_{fwd}I_{fb}$). A gain block 282 amplifies the phase error signal 281 and provides the amplified signal 283 to an integrator 284. Integrator 284 integrates amplified signal 283 and generates rotation signal 222, which is a representation of the relative rotation between complex feedback signal 202 and complex forward path signal 209. Integrator 284 receives a preset signal 288 and an enable signal 291 from the preset circuit 274.

Preset circuit 274 includes a segment detector 286 that receives the in-phase and quadrature components of the complex forward path signal 209 and the complex feedback signal 202. Segment detector 286 receives an enable signal 292 and generates a timer signal 294 and preset signal 288. Enable signal 292 can be controlled by an external controller (not shown) that controls the operation of segment detector 286. Preset signal 288 allows integrator 284 to be preset to a specific value, which in turn causes rotation signal 222 to have a specific value. Timer signal 294 can be used to keep phase aligner 272 idle while preset circuit 274 is activated to generate preset signal 288. After the segment estimation is complete and preset signal 288 is generated, timer signal 294 is de-asserted, and phase aligner 272 can be operated while preset circuit 274 is kept idle.

As shown in FIG. 3, segment detector 286 includes control-path rotators 302(1)-302(N), quadrant detectors 304(1)-304(N) and a fine phase detector 306. Each control-path rotator 302(1)-302(N) receives complex forward path signal 209 and can receive a rotation angle signal 303(1)-303(N). Each control-path rotator 302(1)-302(N) generates a rotated forward path signal 308(1)-308(N) that is rotated by an angle set by the corresponding rotation angle signal 303(1)-303(N). In one implementation, each control-path rotator 302(1)-302(N) rotates complex forward path signal 209 by a preset angle, and control-path rotators 302(1)-302(N) do not receive rotation angle signals 303(1)-303(N). In another implementation, each control-path rotator 302(1)-302(N) rotates complex feedback path signal 202 instead of complex forward path signal 209. The number of control-path rotators can range from one to an arbitrarily large number. The rotation angle of each control-path rotator 302(1)-302(N) typically is unique (that is, no two control-path rotators have the same rotation angle). The rotation angle ($\theta_i$) of each control-path rotators 302(1)-302(N) can be an arbitrary angle such that ($\theta_{min}$) $\leq \theta_i \leq (\theta_{min}+2\pi)$ radians. The value of $\theta_{min}$ can be, for example, $\pi/(2N)$. For certain values of $\theta_i$, such as 0, $\pi/2$, $\pi$, and $3\pi/2$, rotation can be achieved by a simple wire connection.

Rotated forward path signals 308(1)-308(N) and complex feedback path signal 202 optionally can be filtered by filters 312(1)-312(N), 314(1)-314(N), 316, and 318. Filters 312(1)-312(N) and 314(1)-314(N), 316, and 318 can, for example, remove a direct-current (DC) component or noise from the corresponding signal. Quadrant detectors 304(1)-304(N) received (filtered) rotated forward path signals 308(1)-308(N) and (filtered) complex feedback signal 202. Enable signal 292 and a timer signal 326 are combined by AND gate 324 and provided to quadrant detectors 304(1)-304(N) as an enable signal 322. Timer signal 326 is also directly provided to quadrant detectors 304(1)-304(N). Quadrant detectors 304(1)-304(N) create quadrant estimates 320(1)-320(N) and provide the quadrant estimates to fine phase detector 306. Quadrant estimates 320(1)-320(N) indicate the rotation between rotated forward path signals 308(1)-308(N) and feedback signal 202 with a resolution of $\pi/2$ radians. The rotation between the signals is given by $\phi-\theta_r$, and each of quadrant estimates 320(1)-320(N) can be:

0 if $\{0 \leq \phi-\theta_i \leq \pi/2\}$,
1 if $\{\pi/2 \leq \phi-\theta_i \leq \pi\}$,
2 if $\{\pi \leq \phi-\theta_i \leq 3\pi/2\}$, and
3 if $\{3\pi/2 \leq \phi-\theta_i \leq 2\pi\}$.

Segment detector 286 can be implemented with just one (N=1) quadrant detector 304(1), which can produce a quadrant estimate 320(1) of the rotation between the complex forward path signal 209 and the complex feedback signal 202. Segment detector 286 can also be implemented with one control-path rotator 302(1) having a non-zero rotation angle coupled to one quadrant detector 304(1).

Fine phase detector 306 creates an error signal 330 and the preset signal 288, which is a segment estimate of the relative rotation between complex feedback signal 202 and forward path signal 209. Fine phase detector 306 can identify a common overlap segment of the N rotated forward path signals 308(1)-308(N). Fine phase detector 306 can receive rotation angle signals 303(1)-303(N) and can be implemented as a lookup table. For example, if two quadrant detectors are used, fine phase detector 306 can identify a common overlap segment SD using the following table:

| SD Value | $Qd_2 = 0$ | $Qd_2 = 1$ | $Qd_2 = 2$ | $Qd_2 = 3$ |
| --- | --- | --- | --- | --- |
| $Qd_1 = 0$ | 1 | 2 | error | error |
| $Qd_1 = 1$ | error | 3 | 4 | error |
| $Qd_1 = 2$ | error | error | 5 | 6 |
| $Qd_1 = 3$ | 0 | error | error | 7 |

The preset signal 288 can be calculated as $\phi'=(SD-0.5)*\pi/4$. The "error" conditions in the table represent non-overlapping quadrant estimates, and fine phase detector 306 can assert error signal 330 when a non-overlapping set of quadrant estimates is observed. Error signal 330 can be used to re-initiate the segment estimation operation, or can be used to trigger a default safe mode of operation.

In one implementation, fine phase detector 306 is implemented using arithmetic and logic operations such as comparisons, addition, subtraction, multiplication, and division. If only one quadrant detector 304(1) is used, fine phase detector 306 can be omitted, and the quadrant estimate 320(1) of quadrant detector 304(1) can be used directly as the preset signal 288.

FIG. 4 shows a digital implementation of a quadrant detector 400 (e.g., one of quadrant detectors 304[1]-304[N] from FIG. 3). An in-phase component 313 of a rotated version of complex forward path signal 209 (e.g., signal 308[1]) is provided to a comparator 410, and a quadrature component 315 of the rotated version of complex forward path signal 209 is provided to a comparator 414. The (filtered) in-phase component 317 of the complex feedback signal 202 is provided to a comparator 416, and the (filtered) quadrature component 319 of the complex feedback signal 202 is provided to a comparator 412. In one implementation, comparators 410, 412, 414, and 416 compare the respective input signals to ground and output synchronous one-bit quantized representations of the input signals. The outputs of comparators 410, 412, 414, and 416 represent the signs of the respective input signals. Hereafter, when the output from comparators 410, 412, 414, or 416 is discussed, a positive output will be referred to as a 1, and a negative output will be referred to as a −1. In an alterative implementation, the components 313, 315, 317, and 319 are quantized with higher resolution than one bit, and other components in quadrant detector 400 are correspondingly more complex.

A quantized in-phase component of the rotated forward path signal 418a and a quantized quadrature component of the feedback signal 418d are provided to an exclusive-OR (XOR) gate 420. A quantized quadrature component of the rotated forward path signal 418b and a quantized in-phase component of the feedback signal 418c are provided to an XOR gate 425. The quantized in-phase component of the forward path signal 418a and the quantized in-phase component of the feedback signal 418c are also provided to an XOR gate 450, while the quantized quadrature component of the forward path signal 418b and the quantized quadrature component of the feedback signal 418d are provided to an XOR gate 455. XOR gates 420, 425, 450, and 455 perform an exclusive-OR logic operation on their respective input signals. The input signals can have a positive value (1) or a negative value (−1). The outputs of each of XOR gates 420, 425, 450, and 455 in the sign-inverted, scaled, and shifted product of the two respective input signals. For example, when both input signals to an XOR gate are 1 or both are −1, the output of the XOR gate is low (0). When one input signal is −1 and one input signal is 1, the output of the XOR gate is high (1).

The output signal 422 of XOR gate 420 is provided to an integrator 470, and the output signal 423 of XOR gate 425 is scaled by −1 and provided to integrator 470. The output signals 452 and 457 of XOR gates 450 and 455 are provided to an AND gate 460 and an AND gate 465. The inputs of AND gate 460 are both inverting inputs. The output signal 462 of AND gate 460 is provided to an integrator 472, and the output signal 466 of AND gate 465 is scaled by −1 and provided to integrator 472.

Integrator 470 receives output signals 422 and 423 and an enable signal 322 and produces an integrated signal 474 representing the sine of the angle between the rotated version of complex forward path signal 209 and complex feedback signal 202. The sine of the angle is given by the equation $\sin(\phi-\theta_r)=(I_r Q_{fb} - Q_r I_{fb})$, where $\phi$ is the angle between complex forward path signal 209 and complex feedback signal 202, and $\theta_r$ is the angle of rotation (relative to complex forward path signal 209) of the rotated version of complex forward path signal 209 that is provided to comparators 410 and 414. Integrator 472 receives output signals 462 and 466 and enable signal 322 and produces an integrated signal 476 representing the cosine of the angle between the rotated version of complex forward path signal 209 and complex feedback signal 202: $\cos(\phi-\theta_r)=(I_r I_{fb}+Q_r Q_{fb})$. When timer signal 326 is deasserted, the most significant bits (the sign bits) of integrated signal 474 and integrated signal 476 are provided to a look up table 478. Look up table 478 produces quadrant estimate 480. In a noiseless system, the integrators 470 and 472 can be omitted, and an instantaneous quadrant estimate can be formed by taking the signs of the sine and the cosine of the angle between the rotated version of complex forward path signal 209 and complex feedback signal 202: sgn(sin($\phi-\theta_r$)) and sgn(cos($\phi-\theta_r$)).

A quadrant detector can also be implemented using analog circuitry. Analog multipliers, summers, and/or integrators can be used to produce a quadrant estimate.

FIG. 5 is a flowchart of a process 500 for estimating a rotation between two complex signals, for example, a complex forward path signal and a complex feedback signal. The complex forward path signal optionally is rotated (step 510) by one or more rotation angles, and the rotated signals are compared to the complex feedback signal. Rotating the complex forward path signal can change a quadrant in which the complex feedback signal falls relative to the rotated signal. That is, if a set of axes are always aligned with the rotated signal, changing the rotation angle will change the position, relative to the axes, of a vector representing the complex feedback signal. If the rotation angle is changed by more than $\pi/2$, the vector representing the complex feedback signal will fall in a different quadrant of the space defined by the axes than the quadrant in which the vector began. For example, if the complex feedback signal has a rotation of $3\pi/4$ relative to the forward path signal, the complex feedback signal will fall in a first quadrant of a plane whose axes are aligned relative to the complex forward path signal. If the complex forward path signal is rotated by $-\pi/2$, the complex feedback signal will fall in a second quadrant of a plane whose axes are aligned relative to the rotated signal. The quadrants in which the complex feedback signal lies relative to each rotated signal and/or relative to the complex forward path signal are computed (step 520).

When multiple quadrant estimates are computed, the quadrant estimates optionally can be combined into a segment estimate (530). The segment estimate can be formed, for example, by comparing the overlap of the quadrant estimate when each quadrant estimate is translated back to a plane whose axes are aligned relative to the forward path signal. If the number of quadrant estimates is large and the quadrant estimates are relatively noise-free, a very accurate estimate of the rotation between the complex forward path and complex feedback signals can be obtained. The quadrant estimates and/or segment estimate optionally can be used to preset an estimate of the rotation (step 540) that is used, for example, by a phase alignment circuit to control a rotator in the forward path or the feedback path. One or both of the complex forward path signal and the complex feedback signal can be rotated by adjusting the phase of the signal using the estimate of rotation (step 550). In one implementation, the quadrant estimate and/or segment estimate can be used directly as the estimate of rotation.

FIG. 6 shows an alternative implementation of rotation estimator 270. The rotation estimator 600 shown in FIG. 6 reuses components to implement a phase aligner and a preset circuit. Rotation estimator 600 operates in either a phase alignment mode or a preset mode, depending on the state of a mode signal 610, which can be controlled by a timer. A rotator block 605 receives components 208 and 216 of the forward path signal 209 and the mode signal 610. When the mode signal 610 is high, a multiplexer 655 selects an angle signal 657 ($\theta_{start}$) to be used as rotation signal 222. Angle signal 657 can be selected by a user, hardwired, or computed during the operation of rotation estimator 600. If angle signal 657 correctly reflects the rotation between complex forward path signal 209 and complex feedback signal 202, rotation estimator 600 will leave the angle signal 657 unaltered. If angle signal 657 is incorrect, rotation estimator 600 will calculate a correction and add the correction to the angle signal 657 using a combiner 680. When the mode signal 610 is high, the phase alignment actions of rotation estimator 600 are disabled and rotator block 605 rotates complex forward path signal 209 by 45°. When mode signal 610 is high, rotation estimator 600 uses combiners 625 and 630, integrators 635 and 640, and look up table 670 to generate a segment estimate 675. The combination of combiners 625 and 630, integrators 635 and 640, and look up table 670 functions as a quadrant detector. When mode signal 610 is low, rotator block 605 does not rotate complex forward path signal 209. When mode signal 610 is low, the multiplexer 655 selects an output 645 of integrator 635 to be used as rotation signal 222, and rotation estimator 600 acts as a phase aligner. Rotation estimator 600 allows a phase alignment loop to operate with a starting preset value that is established by the sum of segment estimate 675 and angle signal 657.

FIG. 7 shows another alternative implementation of rotation estimator 270. In a rotation estimator 700, a segment detector 705 is used without a phase alignment system to generate rotation signal 222. A segment estimate 710 is stored in a register 715 and is used directly as rotation signal 222 instead of being used as a preset for a phase alignment system. A system that requires only a coarse phase alignment can be implemented using rotation estimator 700. The number (N) of rotators and quadrant detectors included in segment detector 705 can be chosen such that the resolution of the segment estimate 710 is sufficient for the application. Segment detector 705 can be enabled as frequently as necessary to adjust for any misalignment caused by time varying effects such as drift.

The invention and all of the functional operations described in this specification can be implemented in digital electronic circuitry, or in computer hardware, firmware, software, or in combination of them.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

The invention has been described in terms of particular embodiments. Other embodiments are within the scope of the following claims. The described apparatus and method can be used in many different types of digital or analog systems. For example, the apparatus or method can be used in any electronic communication system whose complex signal path includes at least two points between which phase alignment is useful for operation. In addition, the apparatus can be modified and placed at various points in a communications system while still operating substantially as described.

What is claimed is:

1. A circuit comprising:
  a first estimator rotator operable to receive a first complex signal and produce a first rotated complex signal, the first estimator rotator having a non-zero first rotation angle;
  a first quadrant detector for receiving the first rotated complex signal and a second complex signal and producing a first quadrant estimate of a relative rotation between the first rotated complex signal and a second complex signal a rotation-estimation circuit operable to receive the first complex signal and the second complex signal and produce an estimate of a relative rotation between the first and second complex signals; and a variable rotator operable to receive the estimate of the relative rotation and rotate at least one of the first and second complex signals using the estimate of the relative rotation.

2. The circuit of claim 1, wherein:
the first quadrant estimate is used to preset the estimate of the relative rotation between the first and second complex signals.

3. The circuit of claim 1, wherein:
the rotation-estimation circuit includes a second estimator rotator operable to receive the first complex signal and produce a second rotated complex signal, the second estimator rotator having a second rotation angle, the second rotation angle being different from the first rotation angle;

the rotation-estimation circuit includes a second quadrant detector operable to receive the second rotated complex signal and the second complex signal and produce a second quadrant estimate of a rotation between the second rotated complex signal and the second complex signal; and the rotation-estimation circuit includes a fine-phase-detector block operable to receive the first and second quadrant estimates and produce a segment estimate of the rotation between the first and second complex signals.

4. The circuit of claim 3, wherein:
the second rotation angle is zero; and
the second rotated complex signal is identical to the first complex signal.

5. The circuit of claim 3, wherein:
the estimate of the relative rotation between the first and second complex signals includes the segment estimate.

6. The circuit of claim 1, further comprising:
a filter operable to filter at least one of the first rotated complex signal and the second complex signal.

7. The circuit of claim 1, further comprising:
a filter operable to filter at least one of the first rotated complex signal and the second complex signal.

8. The circuit of claim 1, wherein:
the first quadrant detector is a digital quadrant detector.

9. A method comprising:
calculating a first quadrant estimate corresponding to a relative rotation between the first and second complex signals; and rotating at least one of the first and second complex signals using the quadrant estimate of the relative rotation;

producing a first rotated complex signal from the first complex signal, wherein the first quadrant estimate includes an estimate of a relative rotation between the first rotated complex signal and the second complex signal.

10. The method of claim 9, wherein:
rotating at least one of the first and second complex signals using the quadrant estimate includes presenting a rotation estimate using the quadrant estimate.

11. The method of claim 9, further comprising:
producing a second rotated complex signal from the first complex signal, the second rotated complex signal having a different rotation angle relative to the first complex signal that the first rotated complex signal;

calculating a second quadrant estimate of a relative rotation between the second rotated complex signal and the second complex signal; and producing a segment estimate of the rotation between the first and second complex signals using the first and second quadrant estimates.

12. The method of claim 11, wherein:
a rotation angle of the second rotated complex signal relative to the first complex signal is zero degrees.

13. The method of claim 11, wherein:
rotating at least one of the first and second complex signals using the quadrant estimate includes presetting a rotation estimate using the segment estimate.

14. The method of claim 11, further comprising:
rotating at least one of the first and second complex signals using the quadrant estimate includes rotating at least one of the first and second complex signals based on the segment estimate.

15. The circuit of claim 9, further comprising:
filtering at least one of the first rotated complex signal and the second complex signal.

16. A Cartesian feedback transmitter comprising:
a circuit including
a rotation-estimation circuit including a first quadrant detector, the rotation-estimation circuit operable to receive a first complex signal and a second complex signal and produce an estimate of a relative rotation between the first and second complex signals; and a variable rotator operable to receive the estimate of the relative rotation and rotate at least one of the first and second complex signals using the estimate of the relative rotation.

17. The Cartesian feedback transmitter of claim 16, wherein:
the rotation-estimation circuit includes a first estimator rotator operable to receive the first complex signal and produce a first rotated complex signal, the first estimator rotator having a non-zero first rotation angle; and the first quadrant detector receives the first rotated complex signal and the second complex signal and produces a first quadrant estimate of a relative rotation between the first rotated complex signal and the second complex signal.

* * * * *